US008967476B2

(12) United States Patent
Andresky et al.

(10) Patent No.: US 8,967,476 B2
(45) Date of Patent: Mar. 3, 2015

(54) SYNCHRONIZATION TECHNIQUES IN MULTI-TECHNOLOGY/MULTI-FREQUENCY RFID READER ARRAYS

(75) Inventors: David E. Andresky, Lafayette, CO (US); Nathan Cummings, Northglenn, CO (US); Philip Earl Clark, Jr., Kersey, CO (US); Gregory Kenneth Fossen, Thornton, CO (US); Michael William Malone, Boulder, CO (US); Thad Smith, III, Boulder, CO (US)

(73) Assignee: ASSA Abloy AB (SE)

( * ) Notice: Subject to any disclaimer, the term of this patent is extended or adjusted under 35 U.S.C. 154(b) by 1011 days.

(21) Appl. No.: 11/470,660

(22) Filed: Sep. 7, 2006

(65) Prior Publication Data

US 2007/0057057 A1 Mar. 15, 2007

Related U.S. Application Data

(60) Provisional application No. 60/715,506, filed on Sep. 9, 2005.

(51) Int. Cl.
*G06K 7/08* (2006.01)
*G06K 7/00* (2006.01)
*G06K 7/10* (2006.01)

(52) U.S. Cl.
CPC .......... *G06K 7/0008* (2013.01); *G06K 7/10297* (2013.01); *G06K 7/10356* (2013.01)
USPC .............................. 235/451; 235/492; 235/493

(58) Field of Classification Search
CPC . G06K 19/0712; G06K 19/0723; H04Q 5/22; G06Q 20/32; G06Q 20/102; G06Q 20/325; G06Q 20/40; G06F 8/06
USPC .............. 340/10.3, 10.51, 10.33, 10.5, 572.1; 235/492, 451, 453; 455/435.1
See application file for complete search history.

(56) References Cited

U.S. PATENT DOCUMENTS

| 5,952,935 | A | 9/1999 | Mejia et al. |
|---|---|---|---|
| 6,172,609 | B1 | 1/2001 | Lu et al. |
| 6,505,771 | B1 | 1/2003 | Leverne |
| 6,617,962 | B1 | 9/2003 | Horwitz et al. |
| 7,057,511 | B2 | 6/2006 | Shanks et al. |
| 7,084,769 | B2 | 8/2006 | Bauer et al. |
| 7,227,449 | B2 | 6/2007 | Bonneau, Jr. et al. |

(Continued)

FOREIGN PATENT DOCUMENTS

| EP | 0899677 | 3/1999 |
|---|---|---|
| EP | 1672592 | 6/2006 |
| WO | WO2006/068382 | 6/2006 |

OTHER PUBLICATIONS

Smart Card Alliance, Using Smart Cards for Secure Physical Access, Smart Card Alliance Report, Jul. 2003, 54 pages, ID-03003, Princeton Junction, NJ.

(Continued)

*Primary Examiner* — Sonji Johnson
(74) *Attorney, Agent, or Firm* — Sheridan Ross P.C.

(57) ABSTRACT

Methods and apparatus for provisioning the use of multiple readers and/or wireless communication protocols within a defined area are provided. More specifically, a coordinator or the like can be used to manage the activation and deactivation of the multiple readers and/or communication protocols within a single reader such that interference between disparate technologies is avoided.

41 Claims, 8 Drawing Sheets

(56) References Cited

U.S. PATENT DOCUMENTS

| | | | |
|---|---|---|---|
| 2004/0085191 A1 | 5/2004 | Horwitz et al. | |
| 2004/0160322 A1 | 8/2004 | Stilp | |
| 2005/0083180 A1 | 4/2005 | Horwitz et al. | |
| 2005/0204167 A1 | 9/2005 | Conlin et al. | |
| 2006/0006986 A1 | 1/2006 | Gravelle et al. | |
| 2006/0206927 A1 | 9/2006 | Wendling et al. | |
| 2006/0261953 A1* | 11/2006 | Diorio et al. | 340/572.2 |
| 2007/0018793 A1* | 1/2007 | Stewart et al. | 340/10.3 |
| 2009/0108992 A1* | 4/2009 | Shafer | 340/10.1 |

OTHER PUBLICATIONS

Michael L. Davis, Workshop on Storage and Processor Card-based Technologies, presentation entitled "Migration Strategies", Jul. 8-9, 2003, retrieved from http://csrc.nist.gov/card-technology/index.html, last updated May 24, 2005, 34 pages.

Barker et al., Card Technology Developments and Gap Analysis Interagency Report, National Institute of Standards and Technology, Interagency Report 7056, Dec. 2003, 100 pages.

European Search Report and Opinion for European Patent Application No. EP 06120405, completed Jun. 22, 2007, 7 pages.

Official Action for European Patent Application No. EP 06120405, dated May 5, 2010, 4 pages.

Official Action for Canadian Patent Application No. 2,559,419, dated Mar. 3, 2011.

Official Action for European Patent Application No. 06120405, dated Apr. 12, 2011, 4 pages.

Official Action for Canada Patent Application No. 2,559,419, dated Nov. 14, 2013 3 pages.

Official Action for Canada Patent Application No. 2.559,419, dated Sep. 25, 2012 4 pages.

* cited by examiner

SYNCHRONIZATION TECHNIQUES IN MULTI-TECHNOLOGY/MULTI-FREQUENCY RFID READER ARRAYS

CROSS REFERENCE TO RELATED APPLICATIONS

This Application claims the benefit of U.S. Provisional Application No. 60/715,506, filed Sep. 9, 2005, the entire disclosure of which is hereby incorporated herein by reference.

FIELD OF THE INVENTION

The present invention is directed to methods, systems, and devices for synchronizing signals from multiple, disparate technology and multiple frequency (MT/MF) radio frequency identification (RFID) readers. Specifically, the present invention provides novel ways of coordinating multiple independent readers and/or communication protocols in a common area.

BACKGROUND

In access control systems, cards or RFID devices are typically used to store data that "uniquely" identifies the device holder or cardholder. To gain access to a resource or asset such as a building, a financial account, information, or a computer, a user presents the card to a "reader" that reads the data and subsequently transmits the read data to an upstream device such as a panel or a host system. At the upstream device a decision is typically made to either grant access to the cardholder or not. There are also readers that combine the functionality of a panel/host and the physical reader into a single unit, which makes the decision. These types of devices are sometimes referred to as stand-alone readers.

Over the years, several different card technologies have been utilized as a machine-readable credential including RFID, magnetic stripe, barium ferrite, optical, bar codes, and others. RFID has displaced most of these technologies and has emerged as the access technology of choice for many reasons including convenience, ability to design a vandal and weather resistant reader, ever-increasing data storage capabilities, and generally higher security. Indeed, electronic access control systems have been incorporating RFID transponders, typically packaged into the convenient form factor of a card, for more than two decades. As used herein, the term card shall mean all kinds of RFID user device, including proximity cards, contactless smart cards, key fobs, near field communication (NFC) enabled PDAs or cellular phones, or any other substrate equipped with an RFID transponder including coins, adhesive labels, and not just devices in a card like format.

Today, a whole new generation of RFID transponders is available offering similar technological advancements. This next generation of devices contains more memory, communicates faster, provides greater security, and costs approximately the same or even less than the previously available technology. Additionally, unlike the previous generations, international standardization of RFID technology implies increasing interoperability among both cards and readers from different manufacturers. This, coupled with the increased security and storage capacities of today's RFID cards, allows a single card to contain multiple applications further increasing user convenience. Moreover, because of the increased security and storage capacities of today's RFID technology, governments and their institutions are mandating their use to replace older less secure identity management technologies. Due to these factors and more, widespread adoption of newer RFID technologies is occurring at an ever-increasing rate.

Since RFID card technology is a mature, reliable, convenient, cost-effective, and popular technology, there is a large installed base of cards and their associated readers using older technology. As new RFID technology is introduced, upgrading every card can be a difficult, time consuming, and costly process. Similarly, the replacement of readers can be a costly and time-consuming process. Thus, it is highly desirable to implement a technology upgrade solution that minimizes the costs and time required to upgrade a system. Alternatively, it may be desirable to implement a technology upgrade solution that can provide for a step-wise implementation of upgrade rather than requiring a total upgrade all at once.

Several approaches of migrating to the newer technologies are available, each with a unique set of advantages and shortcomings. Ultimately the best solution will be one that fits the dynamics of a particular site. In fact combinations of several methods may be employed depending upon the circumstances. Accordingly, a need exists for flexibility in adopting and implementing upgraded technologies In general, there are three basic approaches to upgrading a system. The first approach is to replace all of the readers and cards. The second approach is to utilize cards with both the current and the new technology. The third approach is to utilize readers that can read both existing and new technology cards. Replacing all existing cards and readers is typically the most disruptive and expensive approach of the three choices.

The method of replacing all RFID cards with a card that contains both the existing RFID technology and the new technology also his its downsides. One downside to this particular approach is that the number of existing RFID cards within an overall system is typically much larger than the number of readers. Therefore, the replacement of the entire population of cards may be a waste of resources if, alternatively, only a few readers existed within the system.

Recently some studies have been conducted relating to the costs of re-badging, i.e., replacing existing cards, versus replacing readers. The conclusion of the study indicated that the replacement or upgrade of readers with a new reader that can communicate with both older RFID devices and newer RFID devices is a viable approach that often is less costly and less disruptive than re-badging all users of a secure access system.

SUMMARY

It is therefore an aspect of the present invention to provide a reader that is capable of communicating with different RFID devices (i.e., RFID cards, proximity cards, contactless smart cards, key fobs, near field communication (NFC) enabled PDAs or cellular phones, or any other substrate equipped with an RFID transponder including coins, adhesive labels, passports, badges, watches, etc.), each of which may employ different communication protocols, and some of which may be less secure or technologically outdated. The multiple technology reader is also referred to as a migration reader. Migration readers enable security system customers to migrate from one technology to another without the instantaneous disruption caused by re-badging thousands (or sometimes tens of thousands) of employees, who are sometimes scattered across the globe, such as in airport installations, multi-national corporations, or across multiple facilities like college campuses and hospitals. If the customer has the need to go to a higher security system, say because mutual authentication is required, then a migration reader allows the replacement of the readers at a schedule that is convenient for the end user, as well as for the entity installing the readers. The migration to the higher security badges can then take place at the convenience of the administrator of the security badges, and to match the availability of the employees as they are upgraded from one security card to the next, by attrition, to match their travel or enrollment schedule. In this manner, expenditures can be controlled and spread out over time as makes sense to the end user.

In accordance with one embodiment of the present invention, an array of readers is provided that is capable of communicating with different RFID cards. One or more of the readers in the array of readers may be equipped to communicate via several communication protocols. However, a combination of the readers is intended to accommodate for a population of RFID cards that communicate with different communication protocols.

The array of readers may be controlled by a coordinator or the like that manages the activity (or inactivity) of each reader within the array of readers. Accordingly, if an RFID card is presented to the array of readers, the coordinator is operable to allow a suitable reader to communicate with the RFID device without interruption from other RFID readers. For example, a 125 kHz RFID card may be presented within an active region or area common to the array of readers. Upon presentation of the 125 kHz RFID card a first reader that is enabled to communicate with the 125 kHz RFID card can initiate a communication session with the card. This communication between the first reader and the 125 kHz RFID card may occur almost instantaneously. In other embodiments, the communication may be delayed by a couple seconds while the first reader waits for its turn to become active.

While the communication session is occurring, the coordinator ensures that no other readers are activated that might interrupt the communications between the first reader and the 125 kHz RFID card. The coordinator may, however, choose to activate other readers (i.e., readers operating at 13.56 MHz) that will not interfere with the communications between the 125 kHz RFID card and the first reader. Thus, the coordinator is used to mitigate inconsistent data transfers, reduce the operating range of one or more readers, resolve problems meeting FCC and other regulatory body requirements such as response time and response accuracy, and resolve other problems that occur when multiple readers are used in the same area.

According to embodiments of the present invention, the coordinator instructs each of the readers in the array of readers using message packets, tokens, commands, and/or other communications protocol using any one of several physical electrical interconnection methods (i.e., serial, parallel, and combinations thereof). Readers in an array may even be located in various positions to optimally cover a physical area. In an alternative embodiment, a plurality of reader modules may be located in a common housing.

In accordance with one embodiment of the present invention, a method of controlling multiple RFID communication protocols in a common area is provided. The method comprises the steps of:

activating a first communication protocol;

determining that an RFID device capable of communicating via the first communication protocol is not within the common area; and activating a second communication protocol.

As used herein "common area" is any two or three-dimensional amount of space where two or more communication protocols or the like can be used to communicate with RFID devices. Specifically, a common area may be defined by the extent to which an RF field produced by a first reader, technology module, and/or communication protocol would overlap with an RF field produced by a second reader, technology module, and/or communication protocol if both fields were produced simultaneously. Alternatively, a common area may be defined by the extent of space covered by an RF field generated only by a first reader or a second reader. It should be appreciated that there may be more than two readers employed in accordance with at least some embodiments of the present invention.

Additionally, "communication protocol" refers to a contactless communication method (i.e., near field, far field, surface acoustic wave, etc.) and its associated modulation method, data encoding method, error detection and correction method, data framing method, data communications speed, and/or other reader characteristics as well as the actual frequency of the RF field.

To accommodate multiple readers, technology modules, and/or communication protocols to be effective in a common area, typically one reader, technology module, and/or communication protocol is activated at a time. In other words, a first reader, technology module, and/or communication protocol is active for a first amount of time, and then a second reader, technology module, and/or communication protocol is active for a second amount of time that does not overlap the time in which the first reader, technology module, and/or communication protocol was active. Thus, the common area between the first and second readers and/or communication protocols does not become "polluted" with RF signals resulting in a degradation of performance for both readers, technology modules, and/or communication protocols. However, if non-interfering communication protocols are employed (e.g., an RF communication protocol and an optical communication protocol), then two or more communication protocols may be active in a common area at the same time.

Depending on various factors, readers, technology modules, and/or communication protocols may not be enabled or even remain active for the same amount of time. For example, if the coordinator identifies that one type of RFID card is presented more often than others, the coordinator may adjust the enabling and disabling of readers and/or communication protocols in such a manner to make detection of this type of RFID card occur faster and/or more frequently resulting in a better user experience for the card that is presented more often. Other bases upon which the activation of readers, technology modules, and/or communication protocols may be made includes historical data, time of day, most used frequency, card population information, and so on.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Embodiments of the present invention are directed toward methods, devices, and systems that accommodate for communication with a population of RFID devices enabled to communicate via different communication protocols. Although well suited for use in systems and methods employing RF communication protocols, embodiments of the present invention may be suitable for use in systems employing other communication protocols including, but not limited to, optical communication protocols, magnetic communication protocols, and the like.

Figure 1:
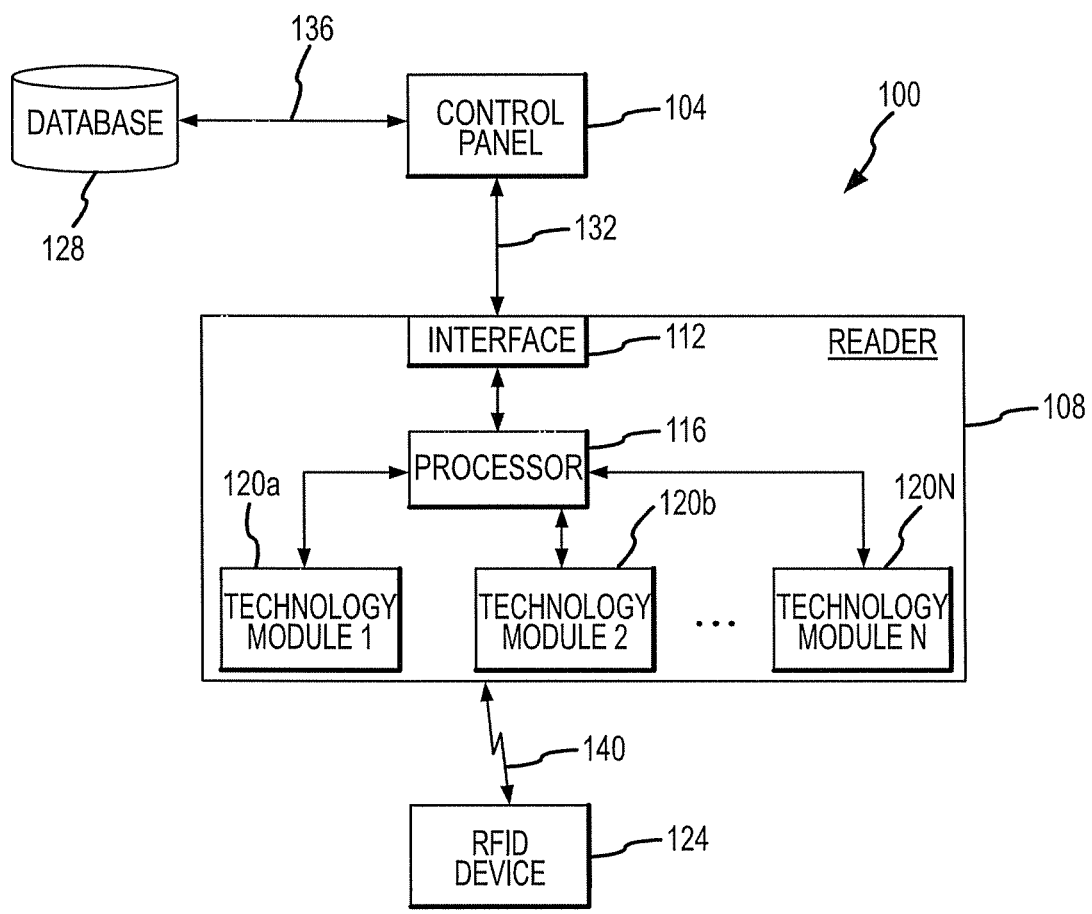
FIG. 1 is a block diagram depicting an exemplary secure access system in accordance with embodiments of the present invention.

Referring initially to FIG. 1, a secure access system 100 will be described in accordance with at least one embodiment of the present invention. The system 100 generally comprises a host 104, a reader 108 comprising an interface 112, a processor 116, and a plurality of technology modules 120a-N, where N is typically greater than or equal to one, at least one RFID device 124, and a database 128.

The host 104 is essentially responsible for the verification of access permissions for users of RFID devices 124. The host 104 is operable to receive data from the reader 108 related to a communication session with the RFID device 124. The host 104 then analyzes the received data and by comparing that data with data stored in the database 128, the authenticity of and permissions for the RFID device 124, and consequently a holder of the RFID device 124, may be determined. For example, the host 104 may receive a card identification number and by comparing that card identification number with a list of permissions for the subject card in the database 128, the host 104 may make a determination that the holder of the RFID device 124 has access permissions to assets protected by the reader 108.

The host 104 and database 128 may be implemented as a control panel or collection of computers used to monitor activities of multiple readers and the assets associated therewith. Alternatively, the host 104 and database 128 may be implemented as a single controller (i.e., a personal computer, laptop, or the like) rather than a control panel.

Alternatively, the reader 108 may include capabilities of the host 104 and database 128. In this embodiment, communications with outside devices may be unnecessary for the reader 108 to determine access permissions for an RFID device 124. Such a stand-alone reader is typically implemented for readers at remote locations that are substantially separated from any host 104.

The database 128 maintains records associated with readers within the system 100, RFID devices 124 within the system 100 and their respective holders or users, algorithm(s) for acquiring, decoding, verifying, and modifying data contained in the readers, algorithm(s) for testing authenticity and validity of the RFID devices 124, and algorithm(s) for implementing actions based on the results of these tests.

The host 104 is operable to communicate with the reader 108 via a first communication line 132. The host 104 is also able to communicate with the database 128 via a second communication line 136. Although the communication lines 132 and 136 are depicted as bidirectional communication lines, it can be appreciated that the communications between system elements may be unidirectional. For example, a unidirectional communication protocol may be employed between the reader 108 and the host 104 (i.e., a Wiegand protocol) and thus the communication line 132 may only need to be able to support unidirectional communications from the reader 108 to the host 104. The communication lines 132 and 136 may be embodied as wired communication lines including, but not limited to, coaxial cables, Ethernet cables, small computer systems interface (SCSI) buses, USB cables, or other similar communication lines. Alternatively, the communication lines 132 and 136 may be embodied as wireless communications implementing protocols including, but not limited to, Bluetooth, Zigbee, GSM, and WiFi communications protocols.

The reader 108 is further operable to communicate with the RFID device 124 via communication interface 140. The communication interface 140 is typically a wireless communication interface employing RF communications. The reader 108 communicates with the RFID device 124 using one or more of the technology modules 120a-N. The reader 108 may initially be equipped with a certain number of technology modules 120a-N. The reader 108 may then be upgraded by the addition of more or newer technology modules 120. For example, additional technology modules 120 that communicate using various communication protocols may be added to the reader 108. Each of the technology modules 120a-N in the reader 108 are operable to communicate via a different communication protocol. For example, the first technology module 120a may be enabled to communicate with contactless smart cards using a 13.56 MHz RF field, whereas the second technology module 120b may be enabled to communicate with RFID devices 124 using a 125 kHz RF field. Thus, the interface 140 may be a combination of a number of different interfaces or different communication protocols. Typically, a single technology module, say technology module 120b, is chosen to communicate for the reader 108 with the RFID device 124 and the other technology modules 120a and 120N do not substantially communicate with the RFID device 124.

The processor 116 coordinates the plurality of technology modules 120a-N such that the communication interface 140 does not become crowded with multiple technology modules trying to communicate with a single RFID device 124 at substantially the same time. The processor 116 is further operable to receive information from any of the technology modules 120a-N and forward the information on to the interface 1112. The interface 112 may be implemented as any type of suitable communications port, for example, an Ethernet port, a modem, a coaxial cable port, a USB port, a wireless adapter, or the like. The information is transmitted from the interface 112 to the host 104 for subsequent verification of the credentials of the RFID device 124.

The processor 116 also serves to identify when an RFID device 124 is within an RF active region of the reader 108. An "active region" for a single reader 108 as used herein is a two or three-dimensional space where the intensity of RF signals emitted by one of the technology modules 120a-N exceeds a threshold of sensitivity of the RFID device 124 and the intensity of RF signals emitted by the RFID device 124 exceeds a threshold of sensitivity of the technology module 120a-N. Once the RFID device 124 is within the active region of one of the technology modules 120a-N the communication interface 140 may be established and communications between the reader 108 and RFID device 124 can commence. As can be appreciated, an active region for one technology module 120 may not completely coincide with an active region generated by another technology module 120. The possible overlapping portion of all the active regions generated by all technology modules 120a-N may be referred to as the common area. Of course, the common area may be a space in which only a subset of the technology modules 120 can create an RF field.

When the processor 116 identifies that one of the technology modules 120a-N has established the communication interface 140 with the RFID device 124, the processor 116 typically deactivates the other technology modules 120 that are not currently communicating with the RFID device 124. This action is taken in an attempt to minimize the number of RF fields being created by all of the technology modules 120a-N.

The processor 116 is essentially responsible for the management of the reader 108 and all of the technology modules 120a-N contained therein. The processor 116 may be implemented as any suitable type of microprocessor or similar type of processing chip. Other examples of a suitable processor 116 include, but are not limited to, an application specific integrated circuit (ASIC), a programmable logic device (PLD), or a field programmable gate array (FPGA).

As noted above, each of the technology modules 120a-N are typically enabled to communicate with RFID devices 124 via different communication protocols. For example, the first technology module 120a may employ a certain type of phase modulation method for communicating with RFID devices 124. The second technology module 120b may employ the same type of phase modulation method as the first technology module 120a but may utilize a different data-framing scheme. Both the first 120a and second 120b technology modules are used to enable the reader 108 to communicate with RFID devices 124 of different types.

As the processor 116 controls and coordinates the activity of each of the technology modules 120a-N, the communication interface 140 dynamically changes based on the technology module 120 that is currently active. For example, the communication interface 140 may be a 13.56 MHz RF field for a first amount of time, and then the communication interface 140 may switch to a 125 kHz RF field for a second amount of time. Regardless of the properties of the communication interface 140 or technology module 120 employed, the processor 116 is operable to format data from any of the technology modules 120a-N into a generic format for transmission to the host 104. This provides for an easily updateable reader 108 that can remain properly formatted for communication with the host 104 and other upstream devices.

The technology modules 120a-N may each be equipped with a dedicated RF receiver/transmitter. This allows each technology module 120 to operate substantially independent of any other technology module 120. However, the processor 116 provides supervision of the independent functionality of the technology modules 120. Thus, the technology modules 120 can operate independently without substantially interfering with each other's operation.

Alternatively, some or all of the technology modules 120 may share an RF receiver/transmitter. The common receiver/transmitter is typically only employed by one of the technology modules 120 at a time to send/receive information to/from RFID devices 124. The processor 116 is operable to monitor the use of the shared RF receiver/transmitter and further controls which technology module 120 uses the RF receiver/transmitter at what time.

One inventive aspect of the present invention is that a reader 108 equipped with multiple technology modules 120a-N is operable to communicate with various types of RFID devices 124. Some of the RFID devices 124 in a population of RFID devices may employ older communication techniques or communicate at a certain RF frequency. Other RFID devices 124 in the population of RFID devices may employ newer communication techniques. Thus, as newer RFID devices 124 are added to the population of RFID devices, a new technology module 120 can be added to the reader 108 to enable it to communicate with the newer RFID devices 124. Thus, upgrades can be achieved with out replacing the reader or the cards. Examples of typical RFID devices 124 include, but are not limited to, proximity cards, contactless smart cards, key fobs, near field communication (NFC) enabled PDAs or cellular phones, or any other substrate equipped with an RFID transponder including coins, adhesive labels, and the like.

Each RFID device 124 in the population of RFID devices may employ different contactless communication protocols (e.g., near field communications, far field communications, surface acoustic wave communication, etc.). More specific differences between communication protocols may include different modulation methods, different data encoding methods, different error detection methods, different error correction methods, different data framing methods, different data communication speed, and other characteristics. As an example, a first and second technology module 120a and 120b may both employ near field communication methods. However, the first technology module 120a may implement different error detection methods than the second technology module 120b. Thus, the first 120a and second 120b technology modules employ different communication protocols.

Figure 2A:
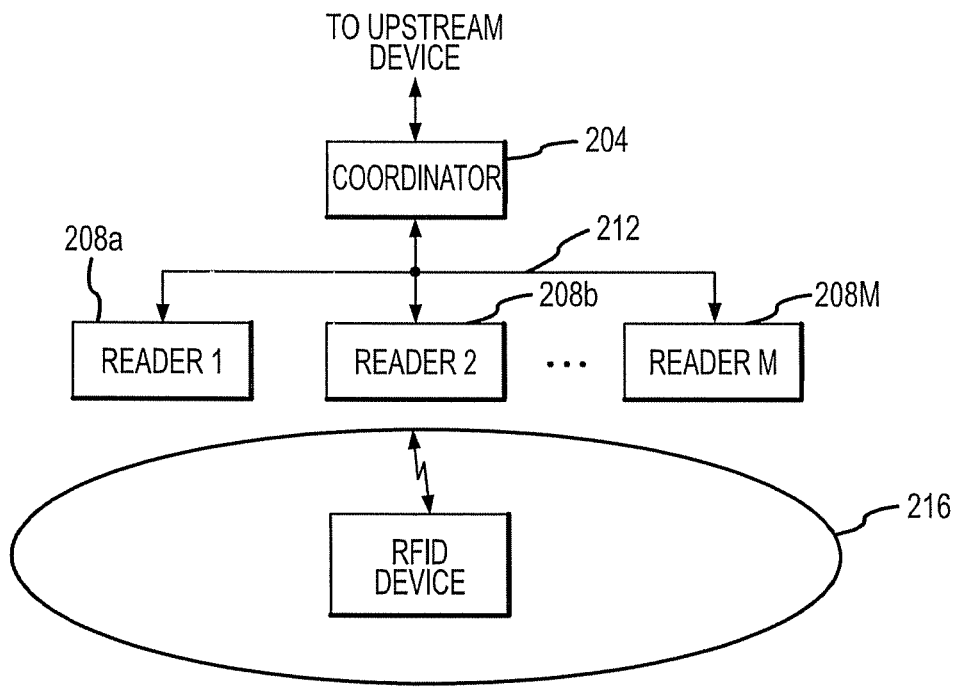
FIG. 2A is a block diagram depicting an array of readers in accordance with embodiments of the present invention.
Figure 2B:
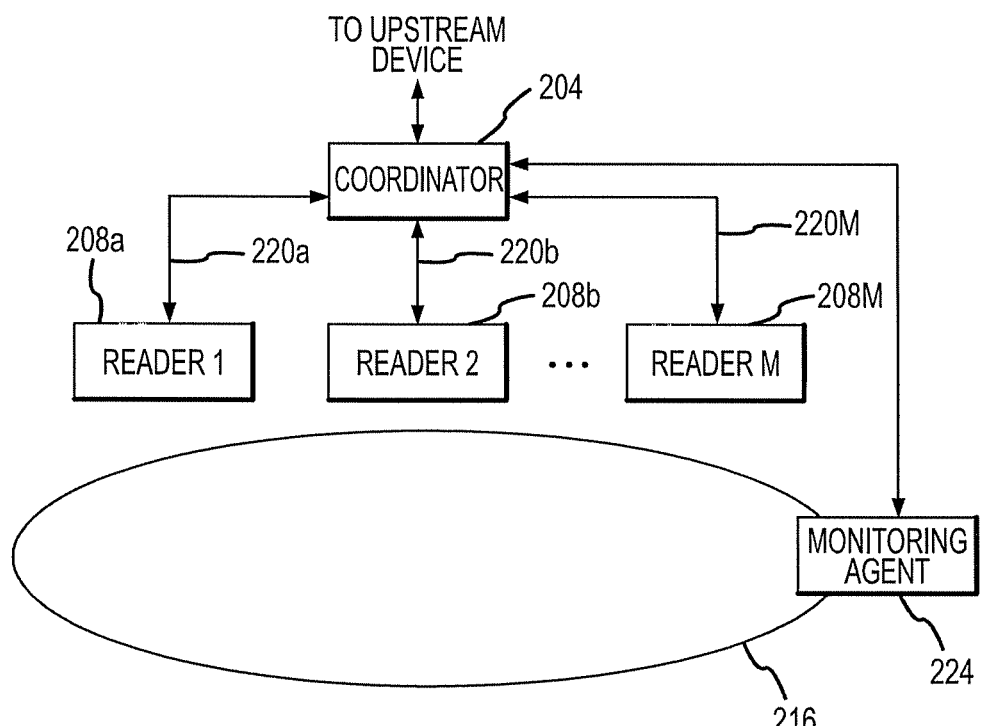
FIG. 2B is a block diagram depicting an alternative configuration of an array of readers in accordance with embodiments of the present invention.

Referring now to FIGS. 2A and 2B, an array of readers 200 will be described in accordance with at least some embodiments of the present invention. The array of readers 200 generally comprise a coordinator 204, and a plurality of readers 208a-M, where M is typically greater than or equal to one. The readers 208a-M are generally physically separate units, some of which may be produced by different manufacturers.

In one embodiment depicted in FIG. 2A, the plurality of readers 208a-M are connected with the coordinator 204 through a communication bus 212. The communication bus 212 may be implemented as a serial communication bus operable to send data from any one of the readers 208a-M to the coordinator 204 and vice versa. The coordinator 204 is subsequently able to communicate the data received from the readers 208 to upstream devices 104, 128.

In one embodiment depicted in FIG. 2B, the plurality of readers 208a-M are connected with the coordinator 204 by dedicated lines 220a-M. The parallel connection of readers 208a-M to the coordinator 204 may enhance the efficiency of data transfers between the coordinator 204 and readers 208a-M than a serial connection to the coordinator 204.

Communication protocols that may be employed by the readers 208 to communicate with the coordinator 204 include, asynchronous transfer mode (ATM) protocol, inter-integrated circuit ($I^2C$), serial peripheral interface (SPI), RS-232, RS-485, SCSI, serial attached SCSI, advanced technology attachment (ATA), serial ATA (SATA), or other communication protocols known in the art.

The readers 208a-M in the array of readers 200 are operable to communicate with at least a subset RFID devices 124 within a population of RFID devices. Each reader 208 effectively replicates the functionality of the technology modules 120a-N discussed above. The functionality of a reader 208 is greater than the functionality of a technology module 120. Stated another way, a reader 208 may be able to perform functions consistent with a technology module 120 (e.g., communicate with RFID devices), but the reader 108 further includes other functionality. The additional functionality included in a reader 108 may include, for example, the ability to communication with external access control devices such as a lock, a solenoid, a control panel, a host, and so on. The subset of RFID devices that a first reader 208a is operable to communicate with may be mutually exclusive of the subset of RFID devices 124 that a second reader 208b is operable to communicate with. In other words, the first reader 208a may only be able to communicate with RFID devices A, B, and C, whereas the second reader 208b may only be able to communicate with RFID devices D, E, and F. Alternatively, a portion of the subset of RFID devices 124 that two readers 208 can communication with may overlap. For example, the first reader 208a may be able to communicate with RFID devices A, B, and C, while the second reader 208b can communicate with RFID devices C, D, E, and F.

Each of the readers 208a-M are equipped with RF receiver/transmitters that provide for communications between the reader 208 and the RFID device 124. One of the readers, for example the first reader 208a, may generate an active RF region of a first size, while a different reader, say the second reader 208b, generates an active RF region of a second size. The common area 216 may be the area or volume of space where all of the active regions of the array of readers 200 would overlap if they were produced simultaneously. Alternatively, the common area 216 may be the extent of space covered by the first or second active region. The readers 208a-M in the array of reader 200 may be dispersed around the common area 216. However, in alternative embodiments, the readers 208a-M may be located in a common housing.

When an RFID device 124 is brought within the common area 216, one or more of the readers 208 typically recognizes the presence of the RFID device 124. The reader 208 that recognizes the presence of the RFID device 124 attempts to initiate communications with the RFID device 124. However, simply because a reader 208 is operable to identify that an RFID device 124 is within the common area 216 does not necessarily mean that the reader 208 is equipped to conduct a communication session with the RFID device 124. Thus, if the reader 208 that detected the presence of the RFID device 124 is unable to communicate with the RFID device 124, another reader 208 is activated in an attempt to initiate communications with the RFID device 124.

The coordinator 204 sends commands, typically in the form of a token, to each of the readers 208 in a predetermined sequence. When the token is received by the first reader 208a, the first reader 208a enables its RF field to see if an RFID device 124 is present. If an RFID device 124 is present and the first reader 208a is equipped to communicate with the RFID device 124, then the RFID device 124 is read and the data is passed to the coordinator 204 for subsequent transmission to an upstream device (i.e., the host 104). After the reader 208a has either completed communications with the RFID device 124, that an RFID device is present but it can't establish communications, or determined that there are no RFID devices 124 close enough to the reader 208a to communicate with, the reader 208a sends the token back to the coordinator 204. The coordinator 204 receives the token from the first reader 208a and subsequently sends the token to the next reader, for example the second reader 208b. The receipt of the token by the second reader 208b allows the second reader 208b to begin its normal activity. This passing of the token from one reader 208 to the next continues until all readers have been activated. Thereafter, the process repeats itself with the coordinator 204 sending the token back to the first reader 208a.

The coordinator 204 continues this enabling and disabling of readers 208 at a rate fast enough to essentially eliminate unnecessary time delays between presentation of an RFID device 124 in the common area 216 and a reaction by a reader 208.

A monitoring agent 224 may also be employed by the coordinator 204 as depicted in FIG. 2B. The monitoring agent 224 is operable to communicate to the coordinator 204 conditions of the common area 216. The monitoring agent 224 may be coupled to the transmitter/receiver of one or more of the readers 208 and can therefore monitor electronic activity of the transmitter/receiver directly. Alternatively, the monitoring agent 224 may be an RF sensor placed somewhere within the common area 216 that is operable to determine information about RF activity in the common area 216. The monitoring agent 224 is basically used as source of feedback by the coordinator 204 to ensure that one reader 208 is not activated while there are still RF signals in the common area 216 being generated by a different reader 208 such that destructive interference can be avoided or minimized. The monitoring agent 224 may also be utilized to modify the basis on which the coordinator 204 switches among readers 208. In other words the monitoring agent 224 can monitor conditions about the population of cards and/or activity within the common area 216 to help adjust and refine the amount of time a given reader 208 should remain active. The monitoring agent 224 can change the active time for one or more readers 208, change the order of activation of the readers 208, and/or cause a switch in a pre-programmed pattern based on various known and monitored parameters that ultimately may affect the state of the common area 216. Parameters that are known to the monitoring agent 224 may include the characteristics of the RFID card population (e.g., number of RFIDs of a certain type in the total population and the relative ratios of the various types of RFIDs in the total population). Parameters that may be monitored by the monitoring agent 224 include the frequency with which a particular type of RFID is presented in the common area 216, the time of day when a particular type of RFID is presented in the common area 216, and other historical considerations.

In accordance with at least one embodiment of the present invention, multiple RFID devices 124 may be present in the common area 216 at substantially the same time. The coordinator 204 can provision for this situation by enabling a first reader 208 to communicate with a first of the multiple RFID devices 124 and enabling a second reader 208 to communicate with a second of the multiple RFID devices 124 at substantially the same time as long as the first and second readers 208 do not detrimentally interfere with one another's communication protocols. The first and second RFID devices 124 may be the same or different types of RFID devices 124 that employ similar or dissimilar communication protocols. In the event that the multiple RFID devices 124 employ similar communication protocols, anti-collision protocols can be employed by the RFID devices 124 that allow one RFID device 124 to communicate with the reader 208 at a time and substantially inhibit the other RFID devices 124 from communicating with the reader 208.

Figure 3:
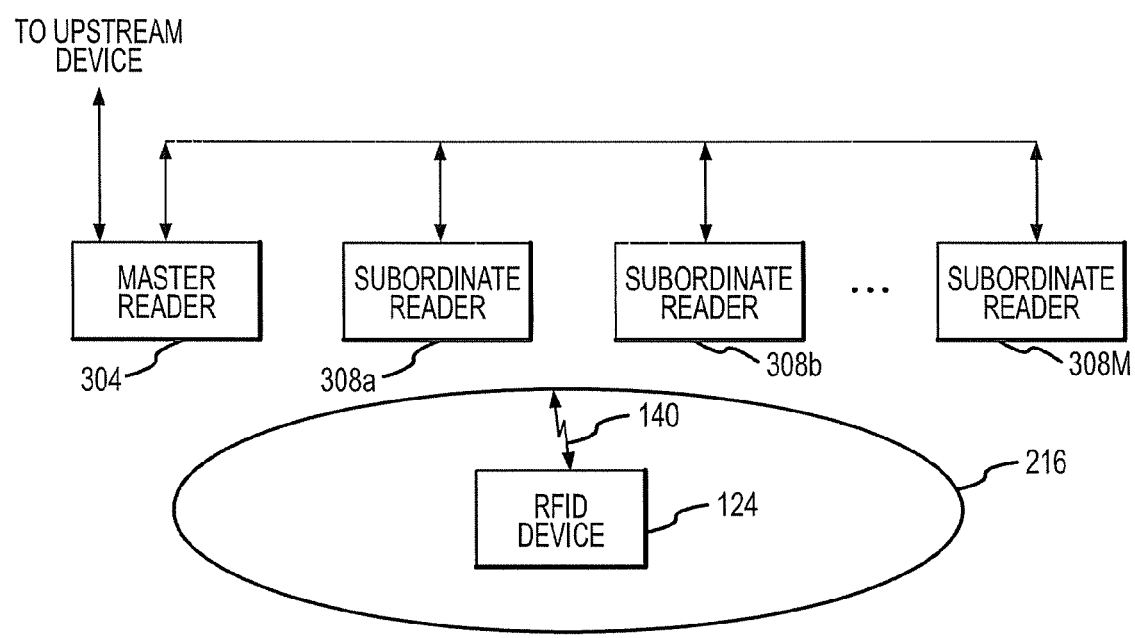
FIG. 3 is a block diagram depicting an array of readers comprising a master reader in accordance with embodiments of the present invention.

Referring now to FIG. 3, an array of readers 200 controlled by a master reader 304 will be described in accordance with at least some embodiments of the present invention. The array 200 generally comprises a master reader 304 and a number of subordinate readers 308a-M. The master reader 304 generally comprises functionality similar to the coordinator 204 discussed above. Additionally, the master reader 304 comprises functionality to communicate with an RFID device 124 presented within an active region 216 of the master reader 304. Stated another way, the functionality of the master reader 304 is greater than the functionality of the coordinator 204 in that the master reader 304 may include the functionality of a coordinator 204 in addition to other functionality common with a reader 208. The master reader 304 may employ the use of tokens or the like to coordinate the activation and deactivation of the subordinate readers 308a-M.

Alternatively, each of the readers 304 and 308a-M may have an activation/deactivation schedule loaded in a section of memory. The activation/deactivation schedule basically lets each reader 304 and 308a-M know either when it is allowed to be active or when it is not allowed to be active. The activation/deactivation schedule loaded on each of the readers 304 and 308a-M is essentially the same and is configured to ensure that one reader will not interfere with another reader. In the event that an activation/deactivation schedule is used to coordinate the efforts of the readers 304 and 308a-M, the master reader 304 may simply act as the communicating reader for the array of readers 200 to an upstream device. Of course, each reader 204 and 208a-M may be enabled to communicate with an upstream device directly, rather then relying upon the master reader 204.

Figure 4A:
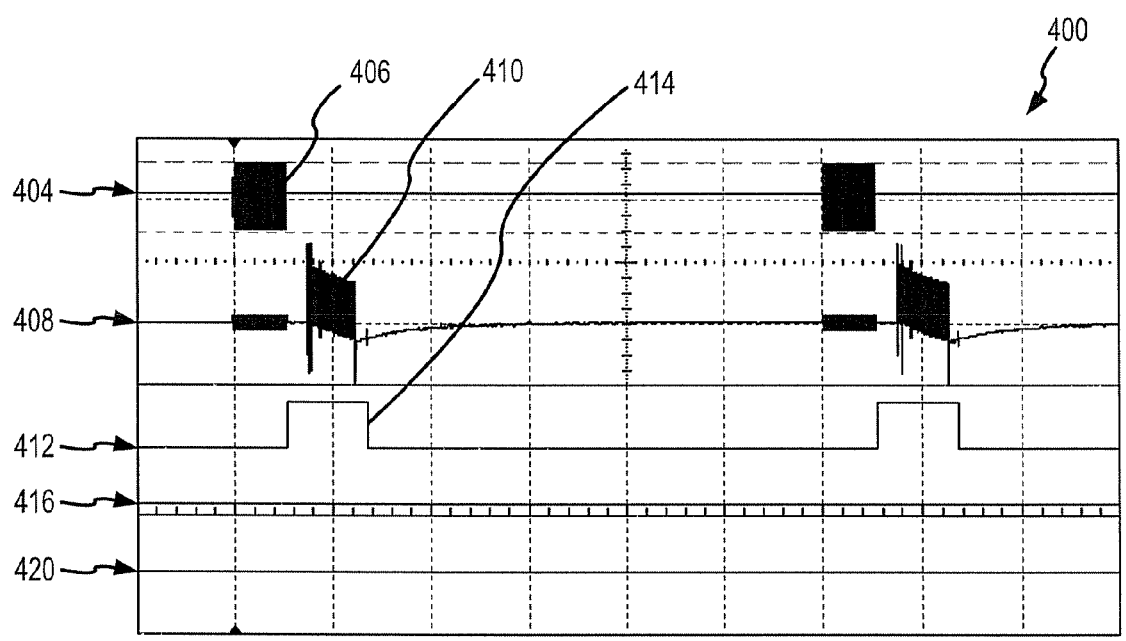
FIG. 4A is a timing diagram depicting voltage outputs of devices used when no RFID device is present in an active area in accordance with embodiments of the present invention.
Figure 4B:
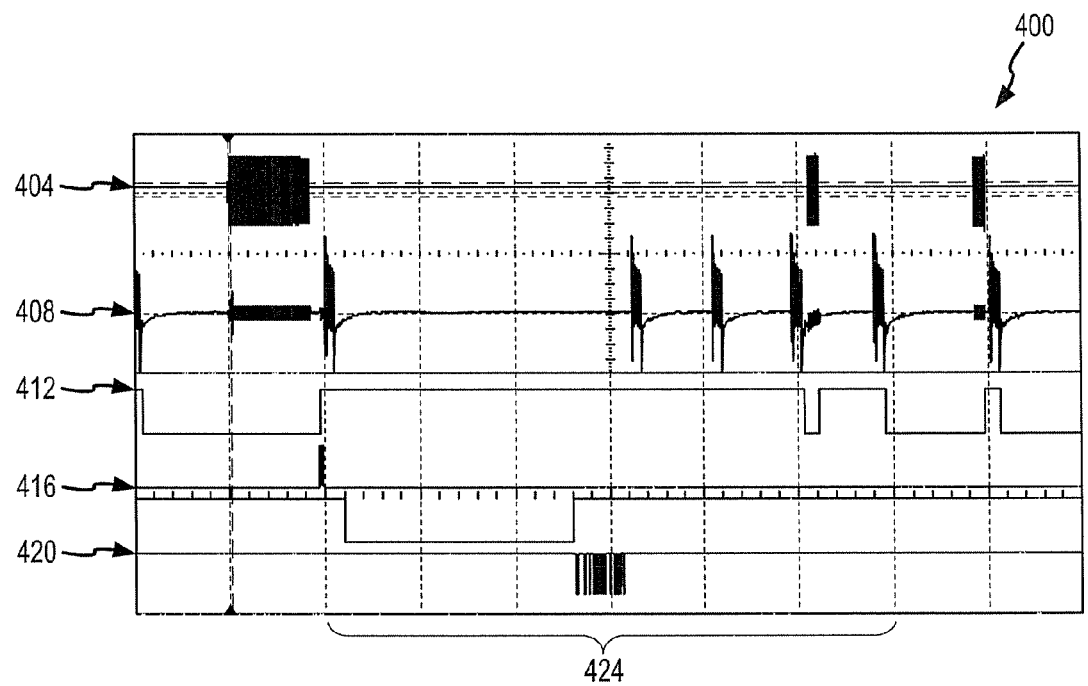
FIG. 4B is a timing diagram depicting voltage outputs of devices used when a first type of RFID device is present in an active area in accordance with embodiments of the present invention.
Figure 4C:
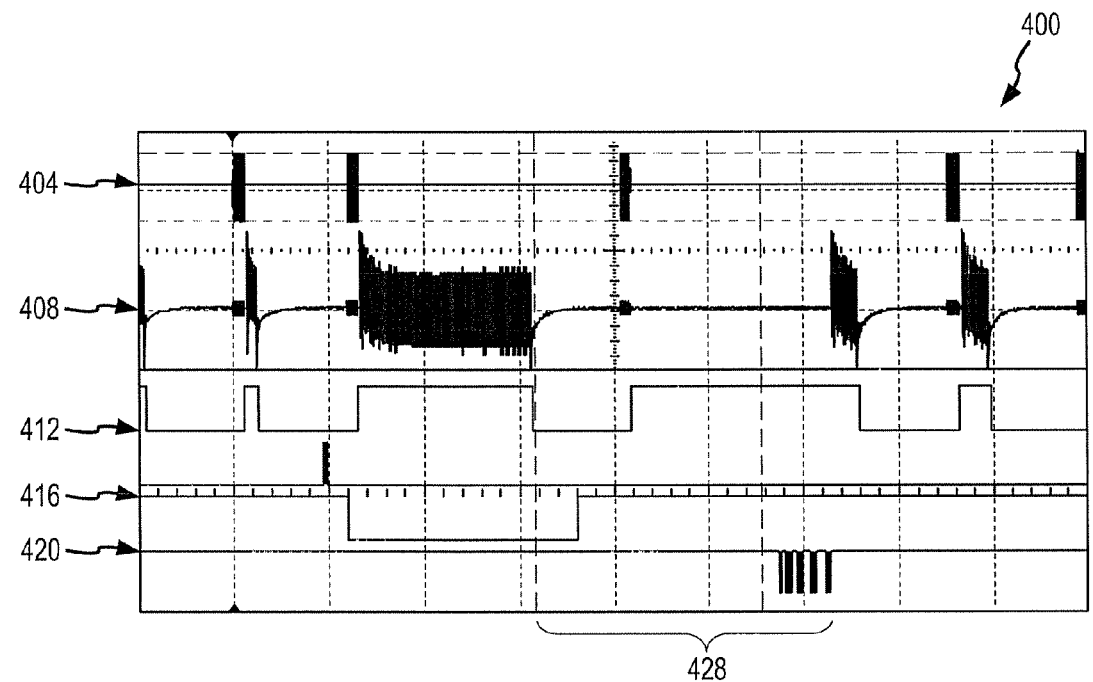
FIG. 4C is a timing diagram depicting voltage outputs of devices used when a second type of RFID device is present in an active area in accordance with embodiments of the present invention.

Referring now to FIGS. 4A-C, the signal activity of various devices in the secure access system 100 will be described in accordance with at least some embodiments of the present invention. In the depicted embodiment the voltage output of a first technology module 120a or reader 208a, 304, or 308a ("first exciter") to generate an RF field is shown as voltage output 404. The voltage output of a second technology module 120b or reader 208b, 304, or 308b ("second exciter") to generate an RF field is shown as voltage output 408. The voltage output of a hold command for the first exciter from a processor 116, coordinator 204, or master reader 304 is shown as voltage output 412. The voltage of the first exciter transmitting data to the processor 116, coordinator 204, or master reader 304 is shown as voltage output 416. The voltage output of an exciter providing feedback to a user in the form of controlling a beeper or a light is depicted as voltage output 420. Finally, the voltage output showing the transfer of data from the processor 116, coordinator 204, or master reader 304 to an upstream device is depicted as voltage output 424.

FIG. 4A depicts the voltage outputs of the above noted devices when no RFID device 124 is present in the common area 216. In operation, the first exciter is activated and voltage activity of the first exciter occurs at a first time. Once the first exciter has been activated for a predetermined amount of time, the hold command is sent to the first exciter and the hold voltage 412 goes high. When the hold voltage 412 is high, the first exciter is substantially prohibited from becoming active. During this period of high hold voltage 412, the second exciter is activated and voltage activity of the second exciter occurs at a second time. This process repeats itself until one of the first and second exciters detect the presence of an RFID device 124.

FIG. 4B depicts the voltage outputs of the above noted devices when a first type of RFID device 124 capable of communicating with the first exciter is present in the common area 216. The first exciter is activated as before and upon detection of the RFID device 124 continues to communicate with the RFID device 124. Once the first exciter has gathered the necessary information from the RFID device 124 (i.e., card identification number, user ID, password, and any other information related to the RFID device 124 and/or its user) the hold voltage 412 goes high so the first exciter send the information to the processor 116, coordinator 204, or master reader 304 as is shown by the activity of the transmission voltage 416.

The second exciter may than be allowed to determine if any RFID devices 124 equipped to communicate with the second exciter are in the common area 216. After the second exciter has determined that it cannot communicate with any RFID devices 124 in the common area 216, the first exciter or one of the controllers of the first exciter provide feedback to holder of the RFID device 124 as is shown by the activity of the feedback voltage 420. Feedback may be provided to a holder of the RFID device 124 through the use of one or a combination of lights, buzzers, beepers, LCD displays, and so on. After the initial feedback has been sent to the user, the data is transmitted from the processor 116, coordinator 204, or master reader 304 to an upstream device as is shown by the activity of the transmission voltage 424. A unidirectional data transmission protocol like the Wiegand protocol may be employed to transmit data to the upstream device for verification of the authenticity of a holder of the RFID device 124.

FIG. 4C depicts the voltage outputs of the above noted devices when a second type of RFID device 124 capable of communicating with the second exciter is present in the common area 216. The first exciter is activated as before and subsequently deactivated when it does not detect any RFID devices 124 with which it can communicate. The hold voltage 412 is then set to high preventing the first exciter from interfering with the second exciter.

Once the hold voltage 412 is set to high, the second exciter is activated and upon the detection of the second type of RFID device 124, the second exciter begins communicating with the RFID device 124. This communication session continues until the second exciter has gathered the necessary information from the RFID device 124. Thereafter, the feedback voltage 420 becomes active indicating to the user that the RFID device 124 has been read. During this feedback the first exciter may be allowed to become active again as the second exciter is no longer communicating with the RFID device 124. The information may then be transmitted from the second exciter through the processor 116, coordinator 204, or master reader 304 to an upstream device.

Figure 5:
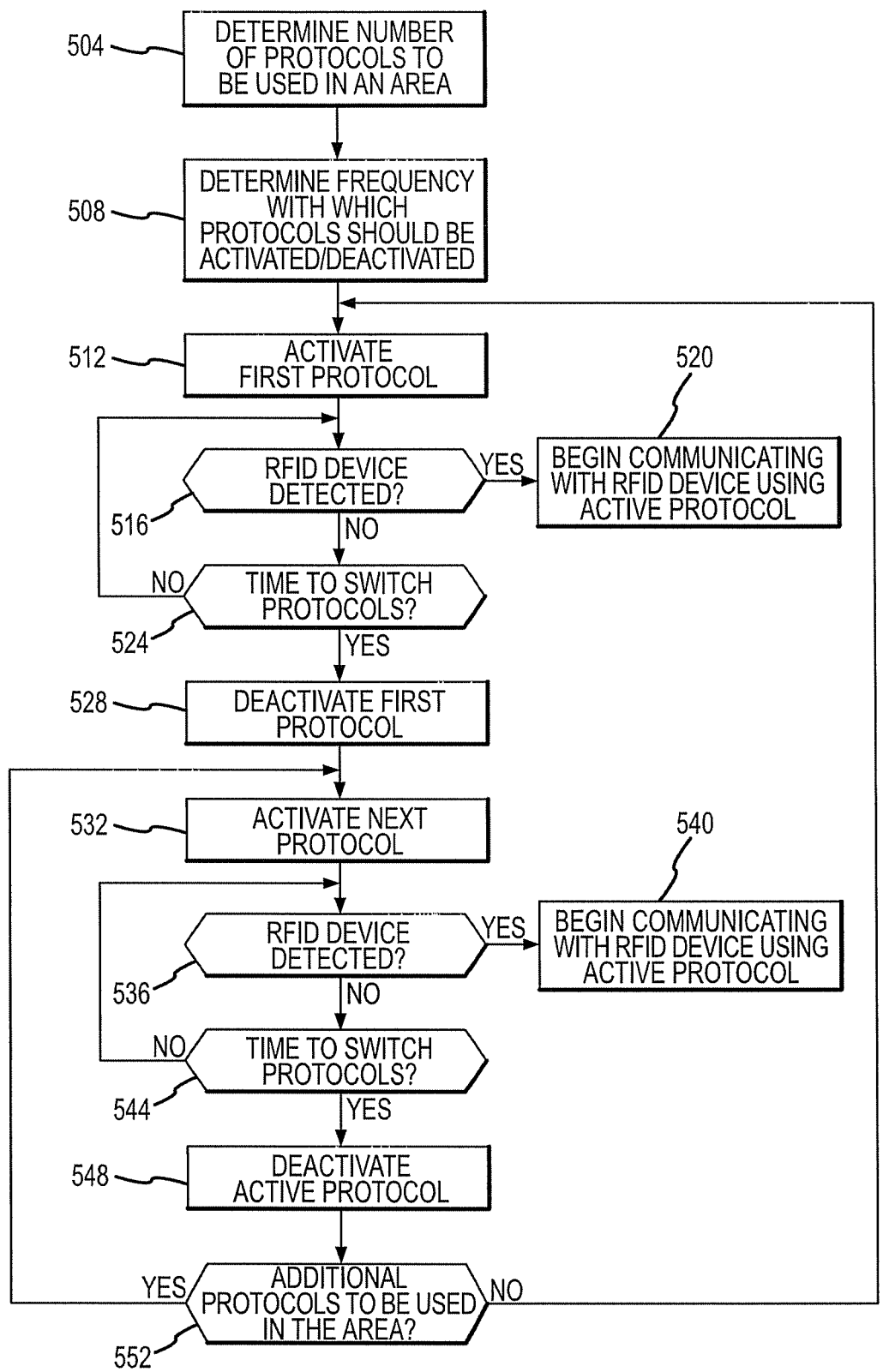
FIG. 5 is a flow diagram depicting a method of controlling communication protocols in accordance with embodiments of the present invention.

Referring now to FIG. 5, a method of controlling multiple communication protocols will be described in accordance with at least some embodiments of the present invention. The method begins by determining a number of protocols that will be used in a common area 216 (step 504). The protocols may be employed by different technology modules 120 or by different readers 204 or 308. Additionally, one or more readers may employ a number of technology modules 120 thus enabling a single reader to communicate via multiple communication protocols.

After the number of protocols is determined, the frequency with which the protocols should be activated/deactivated is determined (step 508). The frequency of activation/deactivation may be the same for each protocol. In other words, a uniform switching frequency may be employed to sequentially activate and deactivate communication protocols. In an alternative embodiment, a non-uniform switching frequency may be employed. For example, if it is determined that a particular type of RFID device 124 is brought into the common area 216 more often than another type of RFID device 124, then the communication protocol associated with the RFID device 124 that appears with more frequency may be activated more often and/or for longer periods of time. Alternatively, a monitor may sense the presence of an RFID device 124 and begin the activation process.

Once the switching frequency has been determined the first communication protocol is activated (step 512). The receipt of an activating token or the like from a controlling device may activate the first communication protocol. As long as a technology module 120 or reader 208, 304, or 308 is in possession of the token it is active and can remain assured that no other device will attempt to interfere with its communications in the common area 216. The device in possession of the token may be active for a variable amount of time, depending upon conditions within the common area 216. For example, the state of the common area 216 may be noisy and the device may need to attempt several communications before it can be sure that no RFID devices 124 are in the first common area 216. On the other hand, the state of the common area 216 may be noise free and the device in possession of the token may be able to quickly determine whether there is an RFID device 124 in the common area 216. Therefore, the use of a control token allows each communication protocol to remain active for varying times that do not depend upon a schedule or predetermined coordination pattern. The use of a control token provides for a self-modifying interrogation protocol among technology modules 120 or readers 208, 304, or 308.

Alternatively, the first communication protocol may activate itself based on an activation/deactivation schedule. While the first communication protocol is active it is determined if any RFID devices 124 capable of communication via the first communication protocol are detected within the common area 216 (step 516). In the event that such an RFID device 124 is identified (i.e., the RFID device 124 and reader 208, 304, or 308 can communicate), the technology module 120 or reader 208, 304, or 308 begins communicating with the RFID device 124 via the active protocol (step 520). The communication session between the RFID device 124 and the technology module 120 or reader 208, 304, or 308 may include actions like sending out polls, identifying, selecting, and authenticating RFID devices 124, receiving information from the RFID device 124, sending information to the RFID device 124, demodulating information received from the RFID device 124, sending the information to a controlling device or other type of upstream device, controlling feedback functions, and the like. After the communications with the RFID device 124 are complete then it is determined if it is time to switch protocols (step 524). Alternatively, in the event that no RFID device 124 capable of communicating via the first communication protocol was detected in step 516, then it is also determined if it is time to switch protocols (step 524). In the event that it is not time to switch protocols, then the method returns to step 516.

Once it is determined that the active protocol should be switched, the first communication protocol is deactivated (step 528). This step may also include the passing of a token from the communicating device back to the controlling device. After the first communication protocol has been deactivated then the next communication protocol is activated (step 532). After the next communication protocol becomes activated it is determined if any RFID devices 124 capable of communicating via the next (i.e., the second) communication protocol are within the common area 216 (step 536). In the event that an RFID device 124 is detected with such capabilities, then communications begin with the RFID device 124 using the next communication protocol (step 540). The actions performed during communication with the RFID device 124 via the next communication protocol may be similar to those described above in relation to the first communication protocol except that one or more aspects of the communication protocol may differ from one another. For example, the first communication protocol may use a 125 kHz RF field whereas the second communication protocol may use a 13.56 MHz RF field to communicate with RFID devices 124.

After the communications with the RFID device 124 are completed in step 540 (or in the event that no RFID device 124 capable of communicating via the next communication protocol is detected) then it is determined if it is time to switch communication protocols (step 548). In the even that it is not time to switch communication protocols then the method returns to step 536. However, in the event that it is time to switch communication protocols then the currently active communication protocol is deactivated (step 548). Thereafter, it is determined if there are additional protocols that are to be used in the common area 216 (step 552). If there is at least a third communication protocol that is to be employed in the common area 216, then the method returns to step 532 and the next communication protocol is activated. If there are no more communication protocols that need to be activated, then the method returns to step 512 and the sequence of activate communication protocols cycles back to the first communication protocol.

Figure 6:
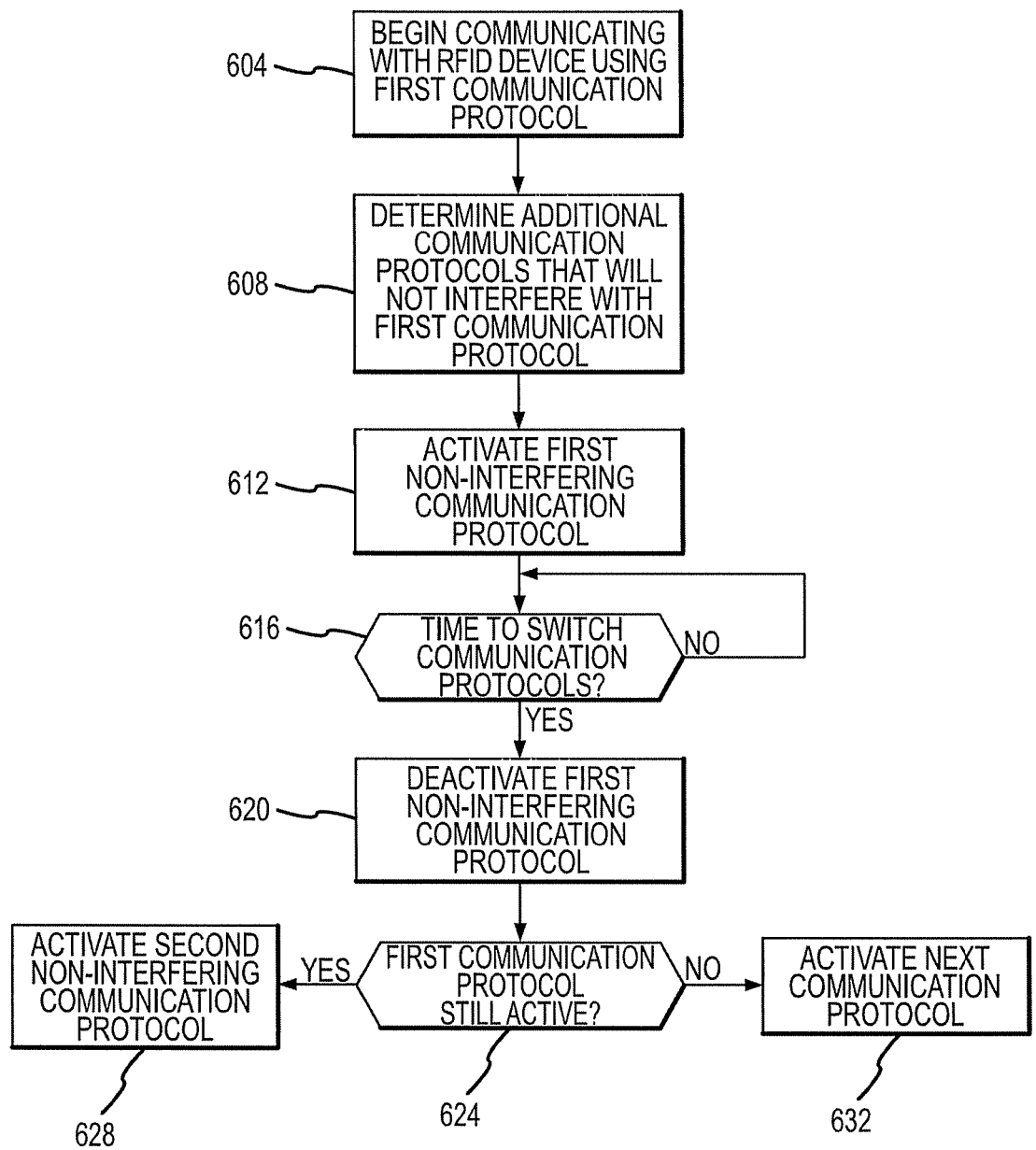
FIG. 6 is a flow diagram depicting a method of activating multiple communication protocols in substantially the same area at substantially the same time in accordance with embodiments of the present invention.

Referring now to FIG. 6, a method of employing multiple communication protocols in a common area 216 will be described in accordance with at least some embodiments of the present invention. There may be some communication protocols that do not substantially interfere with one another. For example, an RF communication protocol may not substantially interfere with a communication protocol that is administered using optical communications (i.e., infrared, ultraviolet, or visible light). Additionally, a first communication protocol using a first RF frequency may not substantially interfere with a second communication protocol using a second RF frequency. A further example of potentially non-interfering communication protocols may include RF communication protocols that both operate at the same frequency but one transmits packets of data on every even clock cycle whereas a second communication protocol transmits packets of data on every odd clock cycle.

Initially, communications are established with an RFID device 124 using a first communication protocol (step 604). Once the first communication session has been established using a first communication protocol, non-interfering communication protocols are identified (step 608). A non-interfering protocol is one that does not substantially disrupt the first communication protocol.

Once at least one non-interfering communication protocol has been identified, the non-interfering communication protocol is activated (step 612). It is advantageous to activate the non-interfering communication protocol as soon as possible so that substantial delays are not perceived by another user presenting an RFID device 124 that communicates by the non-interfering communication protocol.

In step 616 it is determined if it is time to switch communication protocols. If it is not yet time to switch communication protocols, then at least the first non-interfering communication protocol remains active. However, if it is time to switch communication protocols then the first non-interfering communication protocol is deactivated (step 620). Thereafter, it is determined if the first communication protocol is still active (step 624). In other words, it is determined if a communication session is still occurring using the first communication protocol. In the event that the first communication protocol is no longer active then the next communication protocol that was to be activated after the first communication protocol is activated (step 632). Of course, if the next communication protocol that was to be activated was the first non-interfering communication protocol then the next protocol in the queue of protocols is activated. In the event that the first communication protocol is still active, then the second non-interfering communication protocol (assuming that one exists) is activated (step 628).

Figure 7:
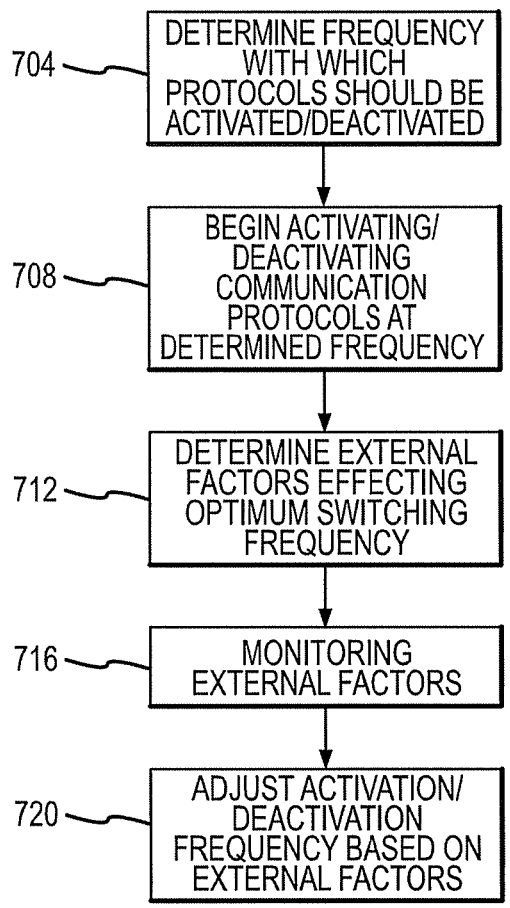
FIG. 7 is a flow diagram depicting a method of optimizing the control of multiple communication protocols in accordance with embodiments of the present invention.

Referring now to FIG. 7, a method of optimizing the activation/deactivation of communication protocols will be described in accordance with at least some embodiments of the present invention. A beginning frequency of activation/deactivation is determined (step 704). As can be appreciated, the beginning frequency may cause each communication protocol to be active for a uniform amount of time. Alternatively, the beginning frequency may implement a non-uniform activation/deactivation of different communication protocols. Once the beginning switching frequency has been determined, then the communication protocols are activated/deactivated according to the beginning frequency (step 708).

As the communication protocols are activated/deactivated and RFID devices 124 are detected and communicated with in the common area 216, various factors are determined that may effect the optimization of the activation/deactivation of the communication protocols (step 712). The factors that may effect the optimization of the switching frequency include, but are not limited to, the frequency of presentation of a certain type of RFID device 124, the number of types of RFID devices 124 within a population of RFID devices, how long a communication session lasts using a certain communication protocol, the amount of power required to keep a particular communication protocol active, and so on. The determined factors are then monitored or otherwise provided as data inputs to the processor 116, coordinator 204, or master reader 304 (step 716). As the monitored factors change based on activity in the common area 216 or based on changes to a population of RFID devices, the activation/deactivation frequency is adjusted to optimize the response time to most RFID devices 124 presented in the common area 216 (step 720). For example, if it is determined that a particular type of RFID device 124 is presented in the common area 216 twice as often as any other RFID device 124, then the communication protocol used to communicate with that type of RFID device 124 may be active twice as long as any other communication protocol. The switching frequency may not be the only operating parameter that is adjusted by the processor 116, coordinator 204, or master reader 304. Other parameters that may be adjusted include the order with which communication protocols are activated/deactivated, the switching frequency as a function of the time of day, and other parameters. Essentially the goal is to activate/deactivate communication protocols such that the user does not perceive any substantial delay in gaining access to a particular asset when he/she presents his/her RFID device 124 to the reader 108 or array of readers 200.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling multiple radio frequency identification (RFID) communication protocols in a common area, comprising:
   transmitting a control token from a coordinator to a first RFID reader; in response to receiving the control token, the first RFID reader activating a first communication protocol that comprises;
   determining, by the first RFID reader, that an RFID device is configured to communicating via the first communication protocol is not within the common area; receiving, at the coordinator the control token from the first RFID reader; after receiving the control token from the first RFID reader, monitoring, by the coordinator, Radio Frequency (RF) activity within the common area;
   determining, by the coordinator and based on the RF activity within the common area, that a second communication protocol is activated within the common area without interfering with the first communication protocol, the second communication protocol varying from the first communication protocol by at least one of modulation method, data encoding method, error detection and correction method, data framing method, data communications speed, and carrier frequency; and transmitting the control token from the coordinator to a second RFID reader; and while the first and second RFID readers are activating their respective communication protocols, performing a coordination optimization process with the coordinator that comprises:
identifying, by the coordinator, that the RFID devices using the second communication protocol are being presented within the common area more frequently than RFID devices using the first communication protocol; storing, by the coordinator, the information related to the relevant frequency of use of the first and second communication protocols in the common area; and using, by the coordinator, the stored information related to the relevant frequency of use of the first and second communication protocols in the common area to increase, for subsequent cycles, an amount of time that the second RFID reader has the control token as compared to an amount of time that the first RFID reader has the control token.

2. The method of claim 1, wherein the second communication protocol is not activated while RF activity from the first communication protocol is detected in the common area.

3. The method of claim 1, further comprising adjusting, by the coordinator and for subsequent cycles, an amount of time that the first communication protocol is active relative to the second communication protocol based on time of day.

4. The method of claim 1, wherein a monitoring agent is used by the coordinator to determine information about current RF activity within the common area.

5. The method of claim 1, wherein the first RFID reader is a master reader and comprises the coordinator and wherein the second RFID reader is separate from the first RFID reader.

6. The method of claim 1, wherein the second RFID reader is only capable of activating the second communication protocol when the second RFID reader is in possession of the control token.

7. The method of claim 6, wherein the coordinator initially cycles between the first communication protocol and the second communication protocol at uniform time intervals and in subsequent cycles allows the second RFID reader to have the control token longer than the first RFID reader thereby implementing a non-uniform activation/deactivation of the second communication protocol as compared to the first communication protocol.

8. The method of claim 1, further comprising:
determining, by the coordinator, a period of time that should pass before switching from the first communication protocol to the second communication protocol, wherein the period of time depends upon data received at the coordinator during the monitoring step;
identifying that the period of time has passed since the first communication protocol was activated; and
switching between the first and second communication protocols.

9. The method of claim 8, wherein the amount of time during which the first communication protocol is active also depends on time of day.

10. The method of claim 1, further comprising:
determining that an RFID device capable of communicating via the second communication protocol is not within the common area; and
switching, by the coordinator, the active communication protocol from the second communication protocol to a third communication protocol by obtaining the control token from the second RFID reader and providing the control token to a third RFID reader.

11. The method of claim 10, wherein the third communication protocol is different from the first and second communication protocol.

12. The method of claim 10, wherein the third communication protocol is the first communication protocol.

13. The method of claim 1, further comprising:
detecting, by the second RFID reader, an RFID device capable of communicating via the second communication protocol within the common area; and
initiating communications with the detected RFID device via the second communication protocol.

14. The method of claim 1, further comprising:
identifying, by the coordinator, at least one non-interfering communication protocol that will not substantially disrupt communications via the second communication protocol with the RFID device;
activating the at least one non-interfering communication protocol.

15. The method of claim 14, wherein the at least one non-interfering communication protocol and second communication protocol are active at substantially the same time within the common area.

16. A system for controlling multiple radio frequency identification (RFID) communication protocols in a common area, comprising:
a first means for communicating operable to communicate with an RFID device via a first communication protocol;
a second means for communicating operable to communicate with an RFID device via a second communication protocol that differs from the first communication protocol by at least one of modulation method, data encoding method, error detection and correction method, data framing method, data communications speed, and carrier frequency; and
a means for coordinating the first and second means for communicating such that both the first and second means for communicating are operable to communicate with one or more RFID devices within the common area without substantially interfering with one another, wherein the means for coordinating is configured to dynamically adjust an amount of time during which the first means for communicating is active based, at least in part, upon current RF activity within the common area as well as historical RF activity within the common area, and wherein the means for coordinating adjusts an amount of time during which the first means for communicating is active as compared to an amount of time that the second means for communicating is active by providing the first means for communicating with a control token and controlling the amount of time that the first means for communicating is allowed to maintain the control token;
and while the first and second RFID readers are activating their respective communication protocols, performing a coordination optimization process with the coordinator that comprises:
identifying, by the coordinator, that the RFID devices using the second communication protocol are being presented within the common area more frequently than RFID devices using the first communication protocol; storing, by the coordinator, the information related to the relevant frequency of use of the first and second communication protocols in the common area; and using, by the coordinator, the stored information related to the relevant frequency of use of the first and second communication protocols in the common area to increase, for subsequent cycles, an amount of time that the second RFID reader has the control token as compared to an amount of time that the first RFID reader has the control token.

17. The system of claim 16, wherein the means for coordinating is operable to deactivate the first means for communicating prior to activating the second means for communicating.

18. The system of claim 16, wherein the first means for communicating and the means for coordinating are associated with a single master RFID reader.

19. The system of claim 16, wherein the first means for communicating is associated with a first RFID reader and the second means for communicating is associated with a second RFID reader.

20. The system of claim 19, wherein the means for coordinating is associated with the first RFID reader, wherein the means for coordinating is operable to determine that no RFID device capable of communicating via the first communication protocol is within the common area, send a message containing the control token to the second RFID reader indicating to the second RFID reader that no RFID device capable of communicating via the first communication protocol was within the common area, and deactivate the first means for communicating.

21. The system of claim 20, wherein the second RFID reader is operable to receive the message sent from the first RFID reader and activate the second means for communicating.

22. The system of claim 16, wherein the means for coordinating is operable to determine a period of time that should pass before switching an active means for communicating from the first means to the second means for communicating, identify that the period of time has passed since the first communication protocol was activated, and switch the active means for communicating from the first means to the second means for communicating.

23. The system of claim 22, further comprising a means for monitoring RF activity in the common area that is operable to communicate with the means for coordinating such that the means for coordinating can dynamically adjust the determined period of time based on time of day.

24. The system of claim 16, wherein the second means for communicating is operable to detect an RFID device capable of communicating via the second communication protocol within the common area and initiate communications with the detected RFID device via the second communication protocol.

25. The system of claim 24, wherein the means for controlling is operable to identify at least one non-interfering communication protocol that will not disrupt communications via the second communication protocol with the RFID device and activate the at least one non-interfering communication protocol.

26. An array of RFID readers, comprising:
a first RFID reader operable to communicate with RFID devices via a first communication protocol in an common area;
a second RFID reader operable to communicate with RFID devices via a second communication protocol in the common area, the second communication protocol varying from the first communication protocol by at least one of modulation method, data encoding method, error detection and correction method, data framing method, data communications speed, and carrier frequency; and
a coordinator operable to manage the activity of the first and second RFID readers by coordinating an exchange of a control token between the first and second RFID readers such that the first communication protocol does not substantially interfere with the second communication protocol, wherein the coordinator is configured to dynamically adjusting an amount of time during which the first RFID reader is active based, at least in part, upon current RF conditions within the common area and also based on historical information related to frequency of presentation of certain types of RFID devices within the common area by providing the first RFID reader with the control token and controlling the amount of time that the first RFID reader is allowed to maintain the control token; and while the first and second RFID readers are activating their respective communication protocols, performing a coordination optimization process with the coordinator that comprises:
identifying, by the coordinator, that the RFID devices using the second communication protocol are being presented within the common area more frequently than RFID devices using the first communication protocol; storing, by the coordinator, the information related to the relevant frequency of use of the first and second communication protocols in the common area; and using, by the coordinator, the stored information related to the relevant frequency of use of the first and second communication protocols in the common area to increase, for subsequent cycles, an amount of time that the second RFID reader has the control token as compared to an amount of time that the first RFID reader has the control token.

27. The array of claim 26, wherein the coordinator is embodied in at least one of the first and second readers.

28. The array of claim 26, wherein the coordinator is connected to the first RFID reader by a first communication line and is connected to the second RFID reader by a second different communication line.

29. The array of claim 26, wherein the coordinator is connected to at least one of the first and second RFID readers by a communications bus.

30. The array of claim 26, wherein the coordinator communicates with at least one of the first and second RFID readers by at least one of serial asynchronous communications, I²C, SPI, and Wiegand communication methods.

31. The array of claim 26, wherein the coordinator is operable to determine that no RFID device capable of communicating via the first communication protocol is within the common area, send a message containing the control token to the second RFID reader indicating to the second RFID reader that no RFID device capable of communicating via the first communication protocol was within the common area, and deactivate the first RFID reader by virtue of the fact that the control token was taken from the first RFID reader and provided to the second RFID reader.

32. The array of claim 31, wherein the second RFID reader is operable to receive the message sent from the first RFID reader and become active upon receipt of the control token.

33. The array of claim 26, wherein the second RFID reader is operable to detect an RFID device capable of communicating via the second communication protocol within the common area and initiate communications with the detected RFID device via the second communication protocol.

34. The array of claim 26, wherein the coordinator is operable to identify at least one non-interfering communication protocol that will not disrupt communications of the second RFID reader and activate the at least one non-interfering communication protocol while the second RFID reader is also active.

35. The array of claim 26, wherein the first and second readers are in a common enclosure.

36. The array of claim 26, wherein the first reader is made by a first manufacturer and the second reader is made by a second different manufacturer.

37. A device for communicating with RFID devices via multiple communication protocols, comprising:
a first technology module operable to communicate with RFID devices via a first communication protocol;
a second technology module operable to communicate with RFID devices via a second communication protocol, the second communication protocol varying from the first communication protocol by at least one of modulation method, data encoding method, error detection and correction method, data framing method, data communications speed, and carrier frequency; and
a processor operable to coordinate the activity of the first and second technology modules such that the first technology module does not substantially interfere with the second technology module, wherein the processor is further configured to dynamically adjusting an amount of time during which the first technology module is active based, at least in part, upon current RF activity within the common area as well as an amount of power required to keep a particular communication protocol active by providing the first technology module with a control token and controlling an amount of time that the first technology module is allowed to maintain the control token; and while the first and second RFID readers are activating their respective communication protocols, performing a coordination optimization process with the coordinator that comprises: identifying, by the coordinator, that the RFID devices using the second communication protocol are being presented within the common area more frequently than RFID devices using the first communication protocol; storing, by the coordinator, the information related to the relevant frequency of use of the first and second communication protocols in the common area; and using, by the coordinator, the stored information related to the relevant frequency of use of the first and second communication protocols in the common area to increase, for subsequent cycles, an amount of time that the second RFID reader has the control token as compared to an amount of time that the first RFID reader has the control token.

38. The device of claim 37, wherein the processor comprises at least one of a field programmable gate array (FPGA), programmable logic device (PLD), and application specific integrated circuit (ASIC).

39. The device of claim 37, wherein the processor is operable to determine a period of time that should pass before switching from an active first technology module to a second technology module based on historical information related to a frequency of presentation of RFID devices in the common area, identify that the period of time has passed since the first technology module was activated, and activate the second technology module by transferring the control token to the second technology module.

40. The device of claim 37, wherein the second technology module is communicating with an RFID device, and wherein the processor is operable to identify at least one non-interfering technology module that will not disrupt communications via the second communication protocol with the RFID device and activate the at least one non-interfering technology module while the second communication protocol is also active.

41. The device of claim 37, wherein the first communication protocol uses a 125 kHz RF field and the second communication protocol uses a 13.56 MHz RF field.

* * * * *